3,492,382
MANUFACTURE OF GRAPHITE
Geoffrey Brian Redding and Michael Stuart Thomas Price, Weymouth, and Leslie Wilfred Graham, Wimborne, England, assignors to United Kingdom Atomic Energy Authority, London, England
Filed Oct. 20, 1965, Ser. No. 498,495
Claims priority, application Great Britain, Aug. 9, 1965, 34,080/65
Int. Cl. B29c 25/00
U.S. Cl. 264—29                                    9 Claims

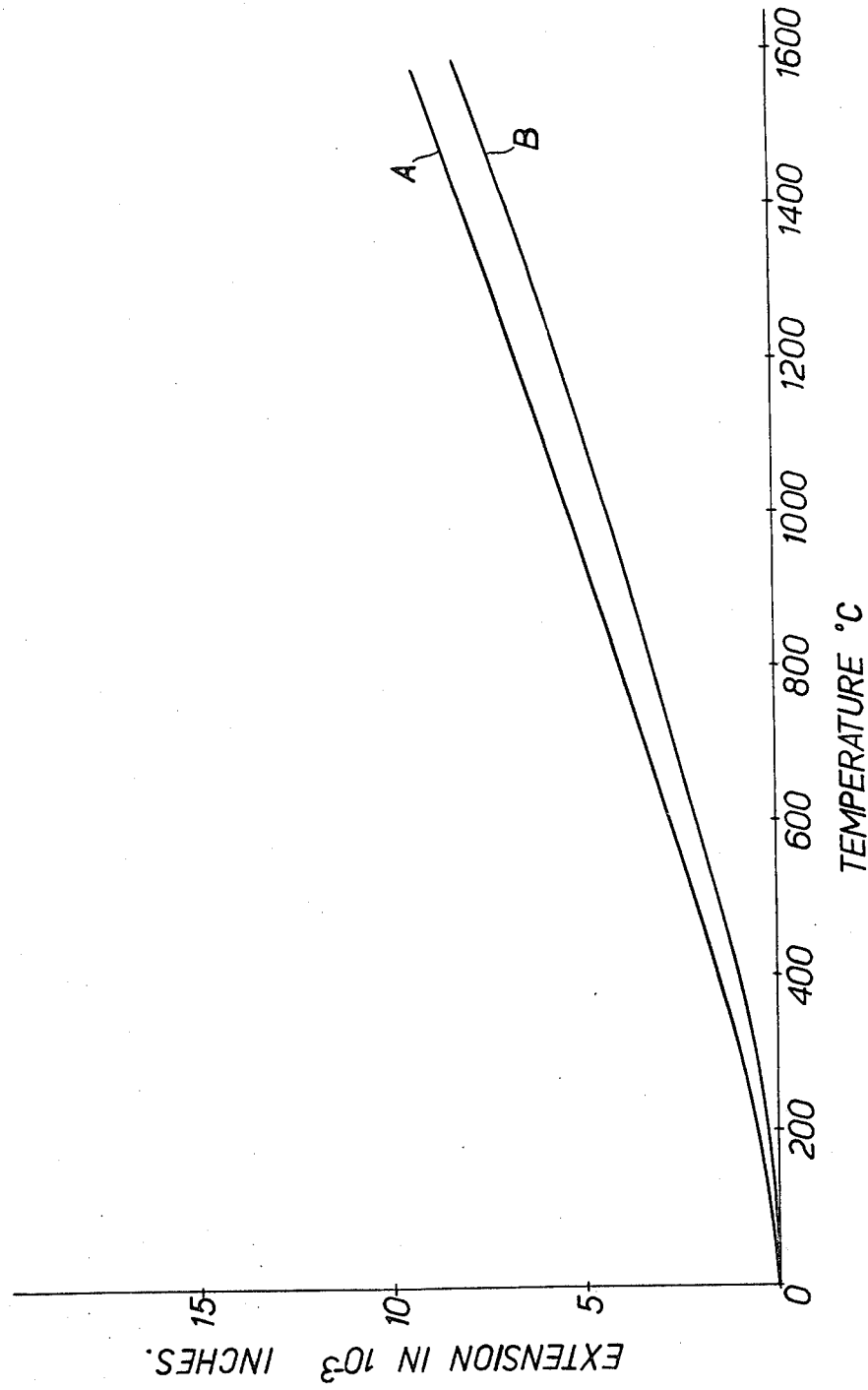

ABSTRACT OF THE DISCLOSURE

A method of making bulk graphite of improved isotropy from anisotropic starting materials comprises tumbling carbonaceous granules in such a manner that larger particles are formed by snowballing the granules with anisotropic carbonaceous grains smaller in size than the granules, and subjecting the enlarged particles to an agglomeration process. A binder is employed in the tumbling operation, and preferably the forming process is followed by a heat treatment. A solvent is sprayed onto the grains as they enter the drum.

---

This invention relates to the manufacture of carbonaceous material.

The working, e.g., pressing or extrusion, of such material introduces a preferred orientation of the grains with the result that the product tends to be anisotropic. That is to say the bulk properties of the material are dissimilar when considered in directions parallel and normal to the directions of preferred orientation.

In contemporary graphite technology, particularly for nuclear uses, attempts are being made to produce an isotropic graphite which it is thought will better withstand the rigorous conditions which exist in nuclear reactors.

It is an object of this invention to provide a method of manufacturing carbonaceous material which is substantially isotropic at least in so far as thermal expansion is concerned. It is isotropy of this kind which is sought in the selection of nuclear graphite.

According to the invention there is provided a method of making isotropic carbonaceous material from anisotropic starting materials by tumbling carbonaceous granules in such a manner that larger particles are formed by snowballing the granules with anisotropic grains smaller in size than the granules and subjecting the enlarged particles to a forming process. Preferably a binder is employed in the tumbling operation and preferably also the forming process is followed by a heat treatment.

Any suitable means of causing the grains to adhere to the granules may be employed but preferably the technique of employing powdered grains which have been pre-treated with a binder, and these pre-treated grains are contacted with a binder solvent prior to entry into the tumbling apparatus so as to soften the binder and make it tacky. It is found that the grains so treated and delivered directly on to the particles in the drum will adhere to the granules as they revolve in the drum, in snowball fashion, rather than to the wall of the drum.

In one process for forming isotropic graphite embodying the invention and described here by way of example a supply of powdered graphite grains was first prepared for feeding into the tumbling drum. For this purpose a batch of calcined anisotropic petroleum coke was crushed and sieved to yield grains below 250 microns. This crushed coke was then micronised and the fraction below 50 microns was graphitised at a temperature of 2600° C. The graphitised grains were mixed with a phenol formaldehyde resin dissolved in a solvent. After mixing for half an hour, the material was removed from the mixer, the solvent having dried off, and the product ground/crushed and sieved to select the fraction below 76 microns. This fraction constitutes the powdered graphite filler for use in the graphite forming process.

For the latter process a quantity of Pile Grade A graphite was ground to 500 microns and a batch of the granules being of irregular shape and anisotropic, was fed into a drum having one open side and rotated with its axis inclined slightly to the horizontal such that the open side is directed upwards. The drum was about 18 inches diameter and was rotated at 30 r.p.m.

A supply of graphite filler comprising grains smaller in size than the granules was mounted above the drum and a feed pipe was arranged to feed a trickle of the filler to a position whence it could fall freely into the drum. A bottle of binder solvent liquid (methylated spirit) was arranged above the drum and provided with a nozzle wherefrom the liquid could spray into the freely falling powder grains filler so that the filler would become wetted with liquid just prior to its entering the drum. As it entered the drum the solvent-wetted grains fell upon the layer of granules which were being tumbled in the drum. This process continued until the granules had grown in diameter by the snowballing effect to form larger particles.

The particles so formed were removed from the drum and subjected to a bulk forming process by pressing. A charge of the particles was placed in a die and pressed to 1000 p.s.i. and simultaneously heated to polymerise the binder. The compact was removed from the die and a cylindrical specimen was cut from the cubic compact. The specimen was 1.75″ long and 1.75″ diameter and on examination its structure appeared to be substantially isotropic. As is well known, pressing produces a preferred orientation of the crystallites allowing a comparison of the measurements of the coefficients of thermal expansion both in the direction of the application of the pressing pressure and in a direction perpendicular to that direction to be used as a test of isotropy. Such measurements were made whilst the specimen was heated from 100°–1400° C., and the results for the respective directions of measurements are shown in curve A and B in the accompanying drawing. The curve A represents the thermal expansion in the direction of pressing and the curve B in a direction perpendicular to the pressing direction. The respective coefficients were $3.20 \times 10^{-6}$ and $3.02 \times 10^{-6}$ giving a coefficient ratio of 1.059 termed by workers in this field as the anistropy ratio. This figure may be compared with a coefficient of 2.20 for fine grain extruded graphite of the type used for fuel elements in the O.E.C.D. high temperature reactor (Dragon).

It appears that by use of the invented method, a continuous forming process could be substituted for the pressing operation and a similar degree of isotropy achieved.

One conclusion which may be drawn is that isotropy in the thermal expansion of bulk graphite formed in this manner is not substantially impaired by forming operations which usually induce anisotropy.

Although in the above described example the grains of both the filler and the granules are graphitised before the snowballing operation, of course ungraphitised material such as calcined or uncalcined coke may be employed for the filler or the granules (or both). The heat treatment of the formed body may be carried out at such a temperature as will carbonise/polymerise the binder and may, if desired be high enough to graphitise the product.

We claim:
1. A method of making a carbonaceous material of improved isotropy which resides in tumbling carbonaceous granules consisting essentially of carbon with smaller anisotropic carbonaceous grains in such a manner that larger particles are formed by snowballing and subjecting the particles to an agglomerating process.

2. A method of preparing carbonaceous articles which resides in tumbling carbonaceous granules consisting essentially of carbon in a drum with smaller anisotropic carbonaceous grains, introducing a binder to the tumbling carbonaceous grains such that the particles grow in size by snowballing with the assistance of the binder, pressing a number of such enlarged particles together to form an article of an isotropic carbonaceous material.

3. A method of making carbonaceous material from anisotropic raw materials comprising tumbling carbonaceous granules consisting essentially of carbon and of small diameter in a tumbling drum, feeding carbonaceous grains into the drum, causing the grains to adhere to the granules as an outer coating, allowing the granules to grow in diameter by virtue of the applied coating to form particles removing the enlarged particles, and then subjecting them to a pressing process to form bulk carbonaceous material of high isotropy.

4. A method of making carbonaceous material as claimed in claim 3 which includes the step of pre-coating the carbonaceous grains with a binder before introducing them into the drum.

5. A method as claimed in claim 4 in which the pre-coating process resides in contacting the grains with a binder dissolved in a volative solvent, drying off the solvent, crumbling the resultant product into grains and selecting a suitable size fraction of grains.

6. A method as claimed in claim 5 in which the size fraction selected is below 76 microns.

7. A method as claimed in claim 5 in which the grains are contacted with a solvent for the binder before entering the drum.

8. A method as claimed in claim 7 in which the solvent is sprayed on to the grains as they enter the drum.

9. A method as claimed in claim 4 in which the pressing process is followed by a heat treatment.

References Cited

UNITED STATES PATENTS

| | | | |
|---|---|---|---|
| 1,105,864 | 8/1914 | Waddell | 264—3 |
| 3,173,973 | 3/1965 | Brockway | 264—5 |
| 3,211,812 | 10/1965 | Johnson et al. | 264—5 |
| 3,230,280 | 1/1966 | Kennedy | 264—5 |
| 3,293,332 | 12/1966 | Ingleby | 264—5 |
| 3,344,211 | 9/1967 | Redding et al. | 264—5 |

REUBEN EPSTEIN, Primary Examiner

M. D. SCOLNICK, Assistant Examiner

U.S. Cl. X.R.

23—2092, 314; 117—109; 264—5, 117